(12) United States Patent
Huang

(10) Patent No.: US 12,332,050 B2
(45) Date of Patent: Jun. 17, 2025

(54) UNIVERSAL WHEEL-FIXATION FRAME FOR ELECTRONIC ALIGNMENT SENSOR

(71) Applicant: Jackco Transnational Inc., Azusa, CA (US)

(72) Inventor: John Huang, Azusa, CA (US)

(73) Assignee: Jackco Transnational Inc., Azusa, CA (US)

( * ) Notice: Subject to any disclaimer, the term of this patent is extended or adjusted under 35 U.S.C. 154(b) by 285 days.

(21) Appl. No.: 17/890,729

(22) Filed: Aug. 18, 2022

(65) Prior Publication Data

US 2023/0055181 A1 Feb. 23, 2023

Related U.S. Application Data

(60) Provisional application No. 63/235,363, filed on Aug. 20, 2021.

(51) Int. Cl.

| | | |
|---|---|---|
| *G01B 5/255* | (2006.01) | |
| *G01B 21/26* | (2006.01) | |
| *G01D 11/30* | (2006.01) | |
| *G01B 7/315* | (2006.01) | |

(52) U.S. Cl.
CPC ............. *G01B 5/255* (2013.01); *G01B 21/26* (2013.01); *G01D 11/30* (2013.01); *G01B 7/315* (2013.01); *G01B 2210/58* (2013.01)

(58) Field of Classification Search
CPC .......... G01B 5/24; G01B 5/255; G01B 21/22; G01B 21/26; G01B 7/315; G01B 2210/58; G01D 11/00; G01D 11/30
See application file for complete search history.

(56) References Cited

U.S. PATENT DOCUMENTS

| | | | | |
|---|---|---|---|---|
| 2,378,631 A | * | 6/1945 | Holmes | G01B 5/255 33/203.15 |
| 5,291,660 A | * | 3/1994 | Koerner | B60G 13/006 33/203.13 |
| 6,483,577 B2 | * | 11/2002 | Stieff | G01B 11/2755 356/139.09 |
| 2019/0331482 A1 | * | 10/2019 | Lawrence | G01S 7/4052 |

OTHER PUBLICATIONS

Young et al. "Camber Angle Inspection for Vehicle Wheel Alignments" Feb. 3, 2017. Sensors (Year: 2017).*

* cited by examiner

*Primary Examiner* — Benjamin R Schmitt
(74) *Attorney, Agent, or Firm* — Schwegman Lundberg & Woessner, P.A.

(57) ABSTRACT

An alignment frame for affixing a sensor configured to measure one or more alignment angles to a wheel of a vehicle can include a pair of arms configured to contact a tire mounted on the wheel to support the alignment frame, a center base configured to receive a first bar, a second bar, and a third bar orthogonally aligned in a linear alignment such that the first bar is at ninety degrees from the horizontal axis defined by the second and the third bar, and a spacer positioned on each of the first, second, and third bars and configured to align the bars with a face of the rim so as to center the center base with respect to the rim of the wheel. The center base can receive a mounting portion of the sensor to center the sensor with the respect to the rim of the wheel.

20 Claims, 6 Drawing Sheets

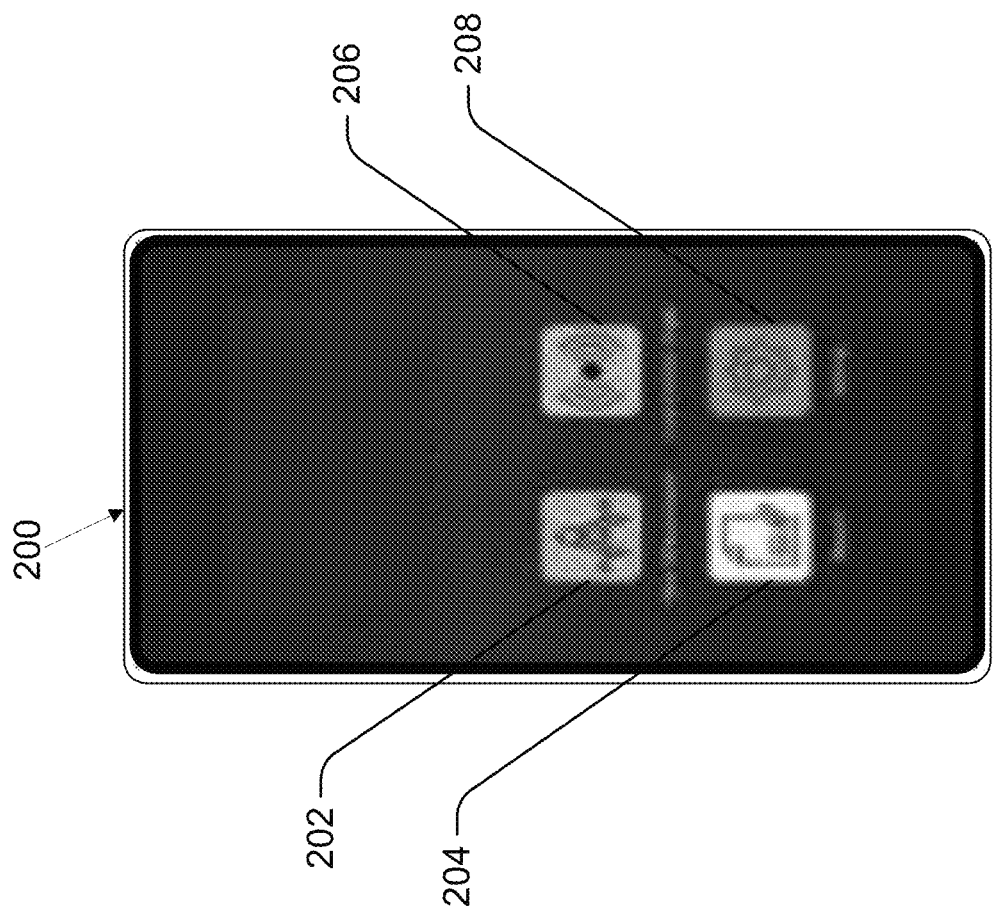

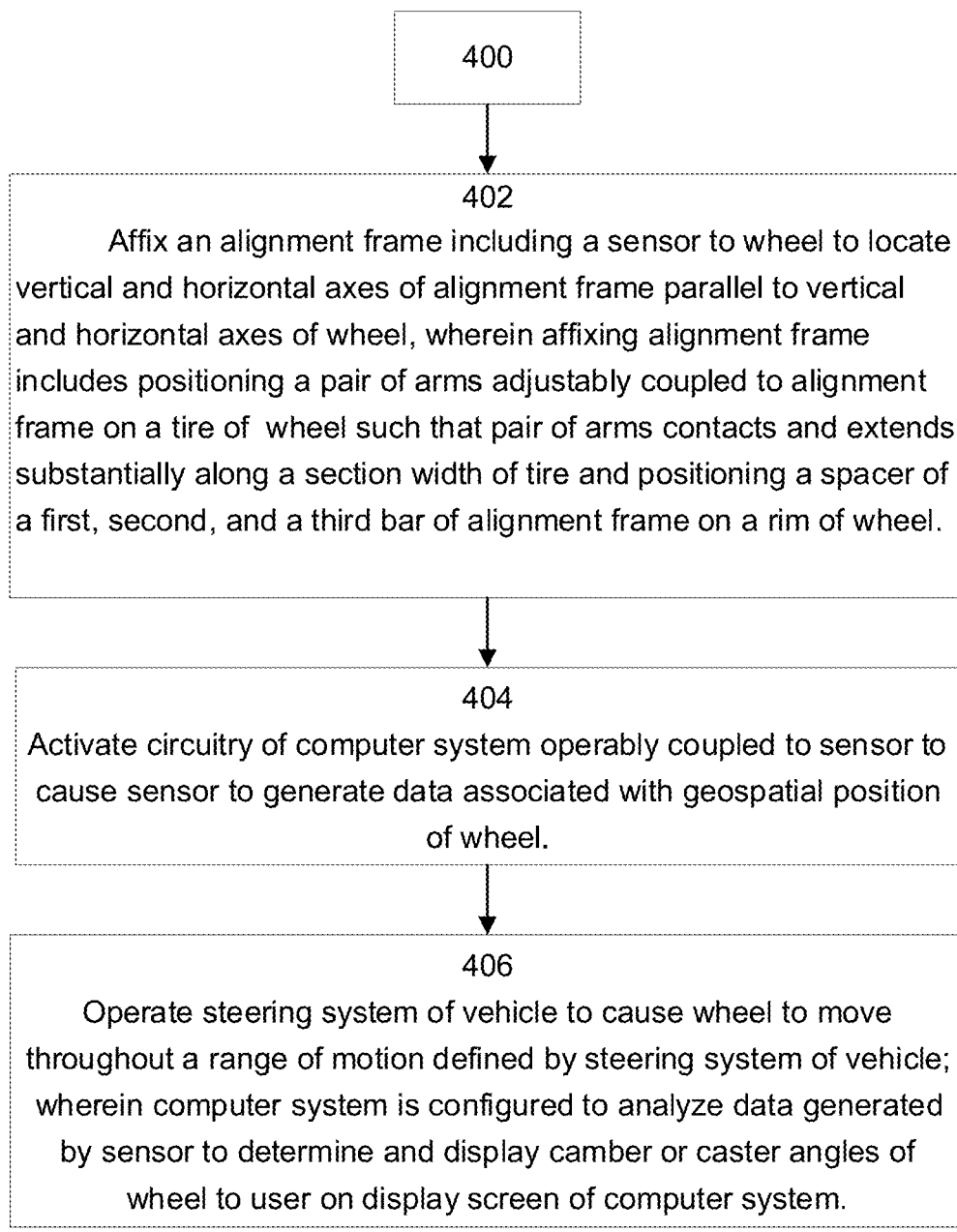

UNIVERSAL WHEEL-FIXATION FRAME FOR ELECTRONIC ALIGNMENT SENSOR

CROSS-REFERENCE TO RELATED APPLICATION

This patent application claims the benefit of U.S. Provisional Patent Application No. 63/235,363, filed Aug. 20, 2021, which is incorporated by reference herein in its entirety.

BACKGROUND

Vehicle alignment involves precisely measuring or additionally calculating any of several established alignment angles used to define the position or orientation of a vehicle's wheel relative to various axes or vectors. Computer-assisted alignment tools or devices can be used to improve various aspects of vehicle alignment.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 illustrates an example of a graphical user interface configured to assist a user in measuring one or more alignment angles defined by a wheel, in accordance with at least one embodiment of the present application.

FIG. 6 illustrates a flowchart showing a method of measuring a camber or a caster angle defined by a wheel of a vehicle, in accordance with at least one embodiment of the present application.

DETAILED DESCRIPTION

Figure 1:
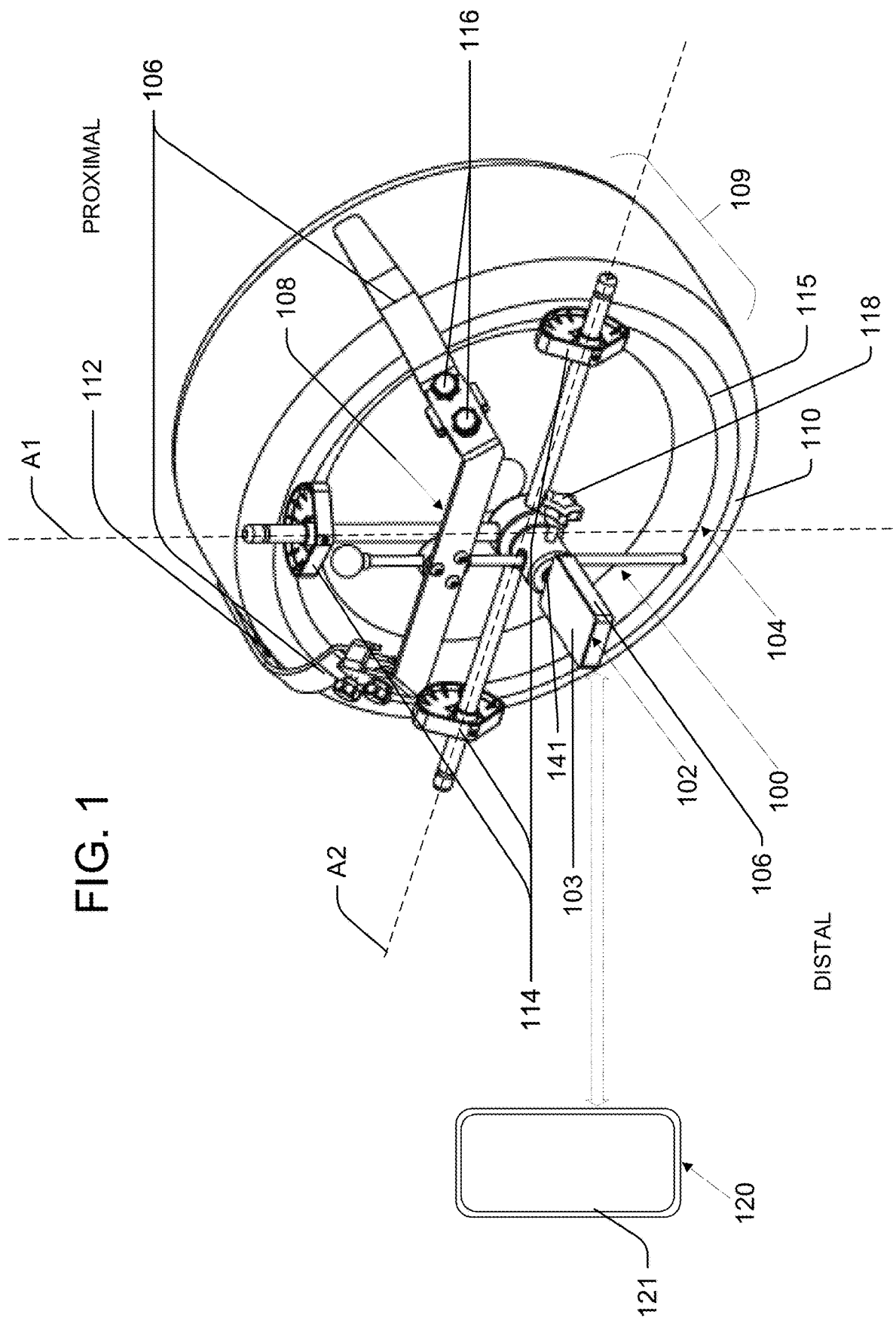
FIG. 1 illustrates a perspective view of an alignment frame and a sensor affixed to a wheel, in accordance with at least one embodiment of the present application.

Wheel alignment is essential to a vehicle's performance. Depending on the objective, an alignment can include measuring any of several alignment angles (e.g. camber, caster, toe, or thrust angles) which quantify positional or orientational relationships defined by a wheel, or certain suspension components, relative to various axes or vectors. For example, camber is the angle formed between a vertical axis of a wheel and a vertical axis of the vehicle, and caster is the angle formed between a vertical axis of a wheel and an axis intersecting an upper and a lower steering pivot point of the vehicle (e.g., between an upper and a lower ball joint, or between a lower ball joint and a strut). The camber and caster angles can greatly affect a vehicle's handling characteristics, such as, among others, steering sensitivity, steering predictability, or straight-line stability.

As a result, vehicle manufacturers develop and publish optimized alignment angles for each model produced for reference by dealers or other repair facilities when necessary, such as after the replacement of various suspension components. In recent years, the systems and methods available for use in vehicle alignment have changed significantly. For example, instead of taking manual measurements or using mechanical alignment devices, automotive repair shops often use computer-assisted alignment machines to measure various alignment angles. Such systems can include a computer system in communication with two or more sensing devices configured to concurrently track the position of the front, rear, or all-four wheels. For example, the computer system can utilize processing circuitry to interpret data received from the sensing devices and can display a resulting alignment angle to a user, such as in terms of degree. However, such alignment machines are typically physically large, complex in both componentry and in operation, expensive, and can require two users to operate when the alignment machine does not include turn plates.

For example, many alignment machines include or are affixed to a four-post hydraulic lift. As a result, such alignment machines are suited to permanent installation at a dedicated automotive repair facility. Additionally, conventional alignment systems typically rely on optical sensing techniques, such including lasers or video cameras located on, positioned with respect to, the wheels being aligned. For example, a laser beam from one sensing device can shine onto other sensing device or onto a proportional scale, or alternatively video cameras can be used to track tracking elements or devices fixedly located on the wheels, from which the computer system can calculate various alignment angles. Moreover, regardless of the type of sensor, any sensing device configured to track wheel position from a location on the wheel should be affixed to the wheel in a stable and in a precise manner in order to remain parallel to vertical and horizontal axes defined by the wheel. This can be particularly challenging when measuring the camber or caster angles of the front wheels of a vehicle, as measuring such angles includes operating a steering system of the vehicle to move the front wheels. Accordingly, such sensing devices often use a plurality of metal hooks or clamps to engage a rim or other faces of the wheel, or threadably engage the vehicle's wheel studs. However, these fixation devices can be time-consuming, labor-intensive, and can cause cosmetic damage to the wheel if not used with care.

Finally, some consumers may change or otherwise adjust a vehicle's alignment frequently. For example, as the camber and caster angles affect vehicle handling characteristics, these angles are often subject to frequent changes to customize vehicle behavior to setup a vehicle for a specific application, such as oval-track racing. As a result, such consumers often use relatively imprecise alignment techniques to estimate an amount of adjustment necessary to various suspension component to achieve a desired effect or a specific alignment angle. Therefore, in view of the above, a less complex, less expensive, and easily portable system for measuring various alignment angles of a vehicle is desirable.

The present disclosure can help to address the above issues, among others, such as by providing a universal wheel-fixation alignment frame capable of allow a user to quickly and easily affix an electronic alignment sensor to a wheel. The alignment frame can allow a user to both center the sensor with respect to the wheel and locate the sensor along vertical and horizontal axes defined by the wheel. The alignment frame can be compact and lightweight, and can be rapidly assembled and disassembled, such as to fit in a vehicle with limited luggage capacity. When coupled to the frame, the sensor can be operable to measure various alignment angles, such by recording and transmitting data to a user's mobile phone, tablet, laptop computer, or other mobile devices for interpretation and display. For example, when the alignment frame and the sensor are affixed to a wheel of a vehicle, a single user can follow on-screen instructions implemented by a mobile application running on the mobile phone to view camber and caster angles of the vehicle in real-time. The sensor and the mobile application can further allow a user to store and compare past measurements, such as to allow a user to quickly and conveniently return the vehicle to a previously saved alignment configuration by referencing such past measurements. Finally, as the alignment frame and the sensor are relatively simplistic in materials and in manufacturing, the alignment frame and sensor can provide an alignment system significantly less expensive than existing alignment systems.

While the above overview discusses examples generally pertaining to passenger or racing vehicles, discussion of the following systems, devices, or methods are also applicable for use in the assessment and monitoring of other types of vehicles, such as commercial vehicles or other heavy equipment. The above overview is intended to provide an overview of subject matter of the present patent application. It is not intended to provide an exclusive or exhaustive explanation of the invention. The description below is included to provide further information about the present patent application.

FIG. 1 illustrates a perspective view of an alignment frame 100 and a sensor 102 affixed to a wheel 104, in accordance with at least one embodiment of the present application. Also shown in FIG. 1 is first axis A1, a second axis A2 defined by the wheel 104, and directional indicators Proximal and Distal. The alignment frame 100 can be configured to receive the sensor 102. For example, the alignment frame 100 can be configured to engage the wheel 104 to position the sensor 102 in a fixed location with respect to the wheel 104, such as by a locating a first surface 103 of the sensor 102 parallel to the first axis A1 (e.g., a vertical axis) and a second surface 106 of the sensor 102 parallel to the second axis A2 (e.g., a horizontal axis) defined by the wheel 104. The alignment frame 100 can include a pair of arms 106 and an upper body 108.

The upper body 108 can extend parallel to the second axis A2 defined by the wheel 104. The pair of arms 106 can be adjustably and detachably coupled to the upper body 108 and can extend outwardly therefrom. The pair of arms 106 can be configured to support the alignment frame 100 on a generally upper portion of the wheel 104. In various embodiments, the arms 106 can extend proximally along at least a portion of a section width 109 (e.g., cross-section, such as defined between inner sidewall outer sidewalls) of a tire 110 mounted on the wheel 104. The pair of arms 106 can include a plurality of protrusions 112 extending transversely therefrom. The protrusions 112 can be configured to engage the tire 110. For example, the protrusions 112 an extend downwardly into various tread features, such as channels or grooves, defined by the tire 110. The pair of arms 106 can thereby inhibit or otherwise limit distal translation of the frame 100, and thereby the sensor 102, away from the wheel 104.

The alignment frame 100 can include a plurality of spacers 114. In various embodiments, the alignment frame 100 can include one, two, three, four, or other numbers of spacers 114. The spacers 114 can be adjustably coupled to the alignment frame 100, such as to allow each of the spacers 114 to contact a rim 115 of the wheel 104. The rim 115 can be a distal face of the wheel 104, or otherwise a surface of the wheel 104 facing away from a vehicle. The alignment frame 100 can thereby limit proximal translation of the alignment frame 100 and the sensor 102 with respect to the wheel 104. As such, the alignment frame 100 can locate the sensor 102 parallel to vertical (e.g., the first axis A1) and horizontal (e.g., the second axis A2) axes defined by the wheel 104 by positioning, adjusting, or otherwise configuring any of the pair of arms 106 or the spacers 114.

The alignment frame 100 can include a plurality of upper fasteners 116. In various embodiments, the alignment frame 100 can include two, three, four, or other numbers of the upper fasteners 116. The upper fasteners 116 can allow a user to rapidly couple, or decouple, the pair of arms 106 to the upper body 108. Similarly, the alignment frame 100 can include a lower fastener 118. The lower fastener 118 can allow a user to rapidly couple, or decouple, the sensor 102 to the alignment frame 100.

The sensor 102 can be configured to generate geospatial location data. In various embodiments, the sensor 102 can include an inertial measurement (IMU) including one or more accelerometers or a gyroscope. The sensor 102 can include a transmitter, such as to allow the sensor 102 to wirelessly communicate with a computer system 120. In one example, the sensor 102 can be the SA-1000 Solo Align® sensor by Jacko® Transnational Inc. of Azusa, CA. In various embodiments, the computer system 120 can be a mobile phone, a tablet, a smartwatch, a laptop, a desktop computer, or any other electronic consumer device including processing circuitry. The computer system 120 can receive data from the sensor 102 using various wired or wireless media, such as, but not limited to, 3G, 4G LTE, RS232, Bluetooth®, or Wi-Fi®.

The computer system 120 can be configured to receive, interpret, analyze, or store the data received from the sensor 102. Such functionality can be implemented by a mobile application running on processing circuitry of the computer system 120. For example, such a mobile application can be a custom application including algorithms configured to enable inertial tracking of the sensor 102. The mobile application can further be configured to cause the computer system 120 to provide a user with various visual or auditory instructions to help guide a user through a measurement process, such as to calculate and display one or more alignment angles of the wheel 104 on a display screen 121 of the computer system 120.

The alignment frame 100 and the sensor 102 can thereby provide several benefits to a consumer over existing alignment systems and devices, such as including, but not limited to, reducing the time, expertise, and expense required to precisely measure the camber or caster angle of a vehicle's wheels. Further, the alignment frame 100 and the sensor 102 can improve the portability and functionality of existing alignment systems and devices.

Figure 2:
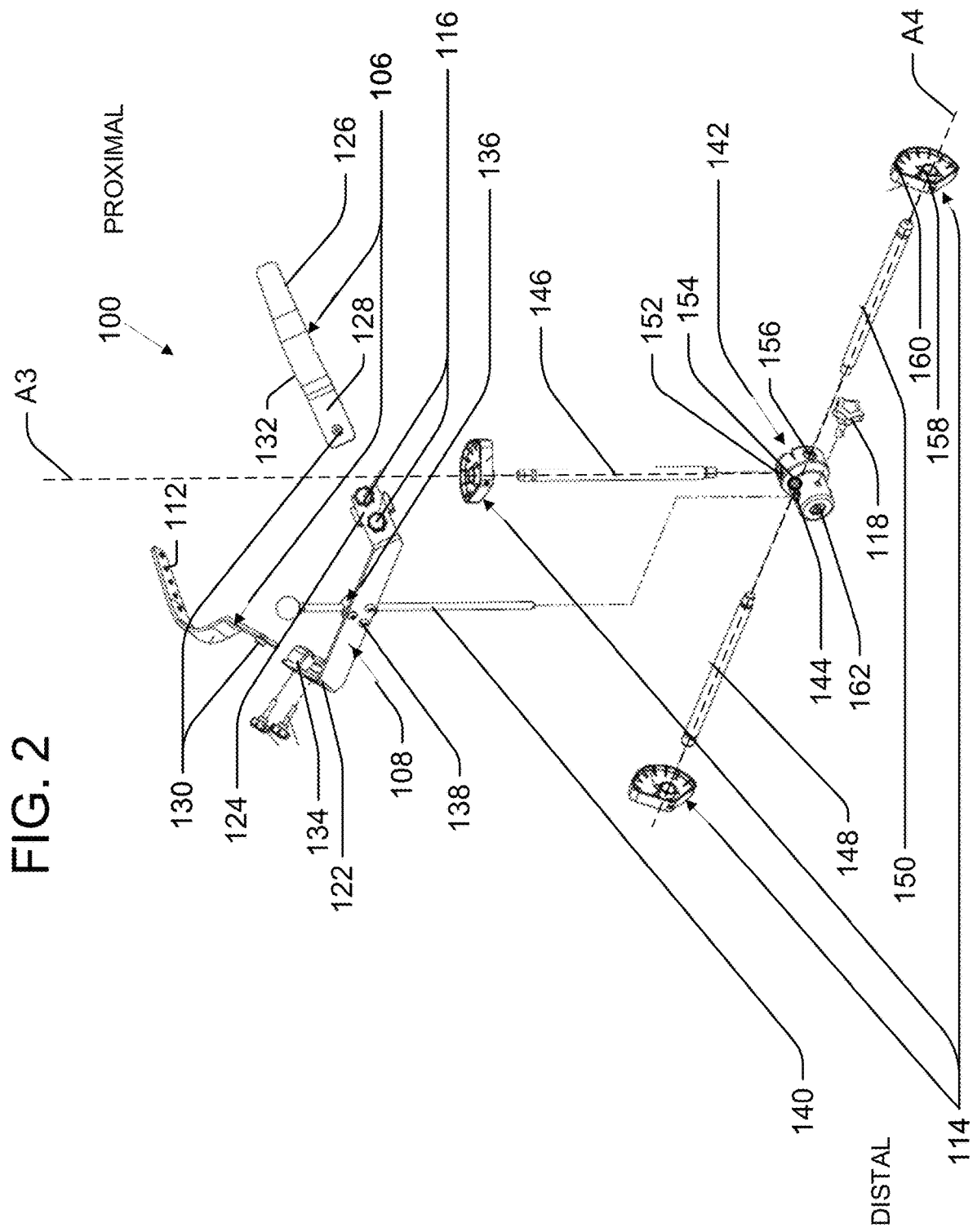
FIG. 2 illustrates an exploded view of the alignment frame of FIG. 1, in accordance with at least one embodiment of the present application.

FIG. 2 illustrates an exploded view of the alignment frame 100 of FIG. 1, in accordance with at least one embodiment of the present application. Also shown in FIG. 2 is a third axis A3 and a fourth axis A4 each defined by the alignment frame 100, and directional indicators Proximal and Distal. Each arm of the pair of arms 106 can include a plurality of protrusions 112. The protrusions 112 can be formed on or in various locations along a longitudinal length of the pair of arms 106, such as in a linear arrangement. For example, any number of the protrusions 112 can be located or otherwise defined along each arm of the pair of arms 106, such to help a user to adjustably position the alignment frame 100 on or along the tire 110 (FIG. 1).

The upper body 108 can extend parallel to the fourth axis A4 (e.g., horizontal axis) of the alignment frame 100. The upper body 108 can include a first end 122 and a second end 124. The first end 122 and the second end 124 can generally be opposite portions of the upper body 108. The first end 122 and the second end 124 can be configured to receive the upper fasteners 116, such as by defining bores or other features configured to correspondingly contact and engage each of the upper fasteners 116. The upper body 108 can be configured to receive various numbers of upper fasteners 116.

Each arm of the pair of arms 106 can include a proximal portion 126 and a distal portion 128. The proximal portion 126 and the distal portion 128 can generally be opposite portions of the pair of arms 106, such as relative to section width 109 (FIG. 1) of the wheel 104 (FIG. 1). The distal portion 128 can define a bore 130. The bore 130 can be configured to receive, contact, and retain at least a portion of one of the upper fasteners 116. For example, the bore 130 can be threaded, such as to retain a threaded portion of one of the upper fasteners 116 and can extend transversely through each arm of the pair of arms 106. In various embodiments, each arm of the pair of arms 106 can define a plurality of bores 130, such as based on a number of the upper fasteners 116 that the upper body 108 is configured to receive. The upper body 108 can be configured to allow a user to adjust or otherwise configure a linear distance between the proximal portion 126 of each arm of the pair of arms 106 and the upper body 108, such as selected based on the section width 109 of the tire 110.

In various embodiments, the upper body 108 can be configured to receive four of the upper fasteners 116, such as shown in FIG. 2, spaced in a linear arrangement along the first end 122 and the second end 124. In such an embodiment, a user can couple the pair of arms 106 to the upper body 108 in a first linear position, such as defined using a first pair of the upper fasteners 116, or in a second linear position, such as defined using a second pair of the upper fasteners 116, where the second linear position defines a linear distance less than or greater than the first linear position. Each arm of the pair of arms 106 can include an offset segment 132 defined between the proximal portion 126 and the distal portion 128. The offset segment 132 can be a segment of the arm 106 extending at an angle with respect to another segment each arm of the pair of arms 106. In various embodiments, the offset segment 132 can be a curved segment, such as configured to allow the proximal portion 126 to extend along the section width 109 (FIG. 1) of the tire 110 and the distal portion 128 to engage the upper body 108 at location below a top surface of the tire 110. The offset segment 132 can also help to inhibit or otherwise limit proximal translation of the alignment frame 100 with respect the tire 110.

The upper body 108 can further include braces 134. Each of the braces 134 can generally be, for example, a pair of flanges extending transversely from the first end 122 and the second end 124 of the upper body 108. When the pair of arms 106 is coupled to the upper body 108, the braces 134 can contact and engage the pair of arms 106, such as to help improve the strength and rigidity of the alignment frame 100. The upper fasteners 116 can also help to strengthen the connection between the pair of arms 106 and the upper body 108, such as by contacting a surface of the pair of arms 106 located outside of the bore 130, to bias the pair of arms 106 toward or against the braces 134.

The alignment frame 100 can include an upper base 136. The upper base 136 can be coupled to a center of the upper body 108, such as via a plurality of fasteners 138 extending transversely through the upper body 108. The alignment frame 100 can include a vertical member 140 extending parallel to, and laterally offset from, the third axis A3 (e.g., vertical axis) of the alignment frame 100. The upper base 136 can be configured to receive the vertical member 140, such as to centrally locate a generally upper portion of the vertical member 140 with respect to the upper body 108. In various embodiments, the upper base 136 can be configured to adjustably receive the vertical member 140, such as to allow translation or rotation of the vertical member 140 along or around the third axis A3.

The alignment frame 100 can include a center base 142. The center base 142 can include a first bore 144. The first bore 144 can be configured to receive a generally lower portion of the vertical member 140. The vertical member 140 can thereby connect the upper body 108 to the center base 142, and together with the upper base 136, allow the center base 142 to be adjustably positioned relative to the wheel 104 via translation along, or rotation around, the third axis A3, such as to center or axially align the center base 142 with a center or a center bore of the rim 115 (FIG. 1) of the wheel 104.

The alignment frame 100 can further include a first bar 146, a second bar 148, and a third bar 150, and the center base 142 can define a second bore 152, a third bore 154 (shown in phantom in FIG. 2), and a fourth bore 156. The second bore 152, the third bore 154, and the fourth bore 156 can be configured to receive and engage an end portion of each of the first bar 146, the second bar 148, and the third bar 150, respectively. As such, the center base 142 can locate each of the first bar 146, the second bar 148, and the third bar 150 with respect to the wheel 104. For example, the first bar 146 can extend parallel to, and laterally offset from, the vertical member 140 when engaged with the second bore 152; and the second bar 148 and the third bar 150 can extend orthogonally or otherwise perpendicular to the first bar 146 and the second bar 148, when engaging the center base 142. However, the center base 142 can be configured to locate any of the first bar 146, the second bar 148, or the third bar 150 in various other positions or orientations relative to third axis A3 or the fourth axis A4.

The first bar 146 can define the third axis A3 (e.g., vertical axis) of the alignment frame 100. The second bar 148 and the third bar 150 can collectively define the fourth axis A4 (e.g., horizontal axis) of the alignment frame 100. For example, the second bar 148 and the third bar 150 can be located in a linear arrangement relative to one another by the second bore 152 and the third bore 154 of the center base 142. Any of the vertical member 140, the first bar 146, the second bar 148, or the third bar 150 can be cylindrical in shape, but can also form other three-dimensional shapes, such as, but not limited to, triangular, rectangular, or hexagonal prisms. Each of the first bar 146, the second bar 148, and the third bar 150 can adjustably locate one of the spacers 114 with respect to the alignment frame 100.

For example, each of the spacers 114 can define a spacer bore 158. The spacer bore 158 can be shaped and sized to receive, contact, or otherwise engage any of the first bar 146, the second bar 148, or the third bar 150, such as to enable a user to adjustably position any of the spacers 114 with respect to the first bar 146, the second bar 148, or the third bar 150. In various embodiments, any of the spacers 114 can be translated along, or rotated around, the third axis A3 or the fourth axis A4, such as to bring the spacers 114 into concurrent contact with the rim 115 based on a vertical height or a horizontal width of the rim 115 of the wheel 104. The spacers 114 can be secured in a position using any of various means, such as, but not limited to, friction between each of the spacers 114 and any of the first bar 146, the second bar 148, or the third bar 150, fasteners such as set screws engageable with the spacers and any of the first bar 146, the second bar 148 or the third bar 150, or other fixation means.

In various embodiments, each of the spacers 114 can form an offset or an oblong shape. Such a shape can be configured to help to the alignment frame 100 to be adjustably positioned, via rotation of any of the spacers 114, proximally or distally with respect to the rim 115 of the wheel 104, such as based on the section width 109 of the tire 110 relative to a width (e.g., cross-section) of the rim 115. For example, in various embodiments, the tire 110 can include a distal surface, such as a sidewall, protruding distally from a face or distal surface of the rim 115. In such embodiments, the spacers 114 can be rotated to move the alignment frame 100 proximally or distally with respect to the rim 115 to maintain contact with the rim 115 irrespective of various dimensions of the tire 110. In various embodiments, the spacers 114 can define a plurality of grooves 160. The grooves 160 can be configured to, for example, index rotation of the spacers 114 around the third axis A3 or the fourth axis A4, such as to allow a user to conveniently orient or position two or more of the spacers 114 equally, relative to one other.

The sensor 102 can include a mounting portion 141. The mounting portion 141 can be a protrusion or intermediary feature extending from the sensor 102. The center base 142 can be configured to receive the mounting portion 141 of the sensor 102, such as to center the sensor 102 with respect to the wheel 104. For example, the center base 142 can define a mounting bore 162 configured to receive the mounting portion 141 (FIG. 1) extending from the sensor 102. The mounting bore 162 can be configured to allow the mounting portion 141 of the sensor 102 to rotate or translate within the mounting bore 162 via a user input, such as performed in response to one or more visual or audible alerts generated by the computer system 120 (FIG. 1) instructing the user to align the first surface 103 (FIG. 1) of sensor 102 with the third axis A3, and the second surface 106 (FIG. 1) of the sensor 102 with the fourth axis A4 of the alignment frame 100.

For example, the sensor 102 can be configured to calculate a difference or delta between a reference plane defined by the first surface 103 and the second surface 106 of the sensor 102, and a plane defined by the third axis A3 and the fourth axis A4 of the alignment frame 100 or a plane defined by the first axis A1 and the second axis A2 of the wheel 104 to help calibrate the sensor 102. In various embodiments, the mounting bore 162 and the mounting portion 141 can be configured to enable gravitational rotation therebetween to thereby align the first surface 103 of sensor 102 with the third axis A3, and the second surface 106 of the sensor 102 with the fourth axis A4 of the alignment to help calibrate the sensor 102. The alignment frame 100 can include a lower fastener 118. The lower fastener 118 can be configured to extend transversely into the mounting bore 162 to engage the mounting portion 141 to couple the sensor 102 to the center base 142. For example, the lower fastener 118 can be a threaded fastener rotatable to enable a user to secure the mounting portion 141 of the sensor 102 in a position where the first surface 103 and the second surface 106 are aligned with the third axis A3 and the fourth axis A4 defined by the alignment frame 100.

The alignment frame 100, including any of various components thereof, can be made of various materials such as, but not limited to, metals such as steel, aluminum, or alloys, plastics, composites, foams, elastomers, ceramics, or the like or any combinations thereof. In view of the above, the alignment frame 100 can allow a user to adjust or otherwise configure the spacers 114, the pair of arms 106, or the upper body 108 relative to the center base 142, such as via translation or rotation, to position each of the spacers in concurrent contact with the rim 115 of the wheel 104, irrespective of various dimensions of the wheel 104 or the tire 110. As such, the alignment frame 100 can also allow a user to operably position (e.g., locate in a position parallel to vertical and horizontal axes of a wheel) the sensor 102 with respect to various types of wheels, such as steel or aluminum wheels, some of which may disallow alignment devices or systems which rely on clamping, or otherwise fixedly engaging, the rim 115 of the wheel 104.

Figure 4A:
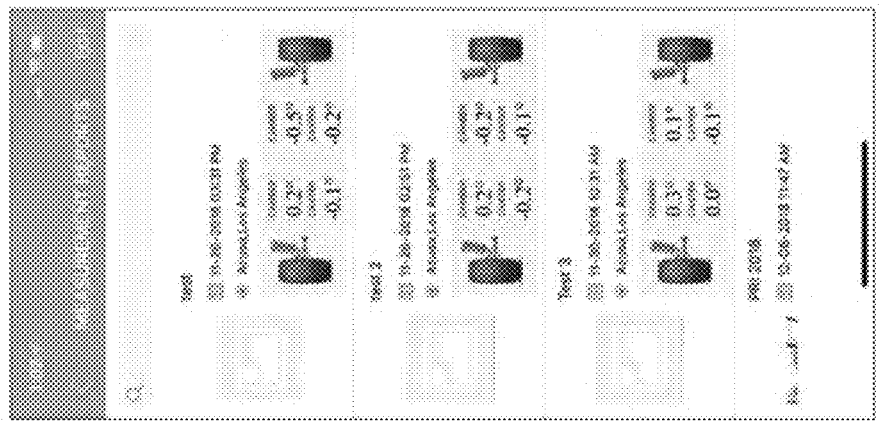
FIGS. 4A-4D illustrate example screenshots from a graphical user interface configured to assist a user in measuring one or more alignment angles defined by a wheel, in accordance with at least one embodiment of the present application.

FIG. 3 illustrates an example of a graphical user interface 200 configured to assist a user in measuring one or more alignment angles defined by a wheel, in accordance with at least one embodiment of the present application. FIGS. 4A-4D illustrate example screenshots from a graphical user interface configured to assist a user in measuring one or more alignment angles defined by a wheel, in accordance with at least one embodiment of the present application. FIGS. 3-4D are discussed below concurrently and with reference to the alignment frame 100 and the sensor 102 shown in, and described with reference to, FIGS. 1-2 above.

As shown in FIG. 3, the graphical user interface 200 can be display on a display screen 121 (FIG. 1) of a computer system 120, such as a mobile device. The display screen 121 can be configured to display a graphical user interface, such as a home screen of a mobile application, by running such a mobile application on processing circuitry of the computer system. In various embodiments, such an application can be a custom or proprietary software application to designed to implement signal communication between the computer system and the sensor 102 (FIG. 1) and facilitate various functions of the sensor 102 and computer system 120. In various embodiments, the graphical user interface 200 can be displayed to user upon starting the application on the computer system 120. The graphical user interface 200 can include various icons configured to control various operations of the sensor 102 and the computer system 120.

In various embodiments, the graphical user interface 200 can include an icon 202, an icon 204, an icon 206, and an icon 208. The icon 202 can be configured to control operations related to selection of a sensor, such as Bluetooth® pairing with the sensor 102 or calibration of the sensor 102 in preparation for a new measurement, such as illustrated by FIG. 4A. For example, the icon 202 can begin or otherwise control a calibration procedure for the sensor 102. In such a calibration procedure, the mobile application running on the computer system 120 (FIG. 1) can be configured to generate one or more user instructions displayable on the user interface 200, or otherwise on the display screen 121 (FIG. 1), to cause a user to rotate or translate the sensor 102, or otherwise position or adjust the alignment frame 100, to align the sensor 102 with vertical and horizontal axes of the wheel 104 (FIG. 1) (e.g., the first axis A1 and the second axis A2, respectively, to help calibrate the sensor 102.

Figure 4B:
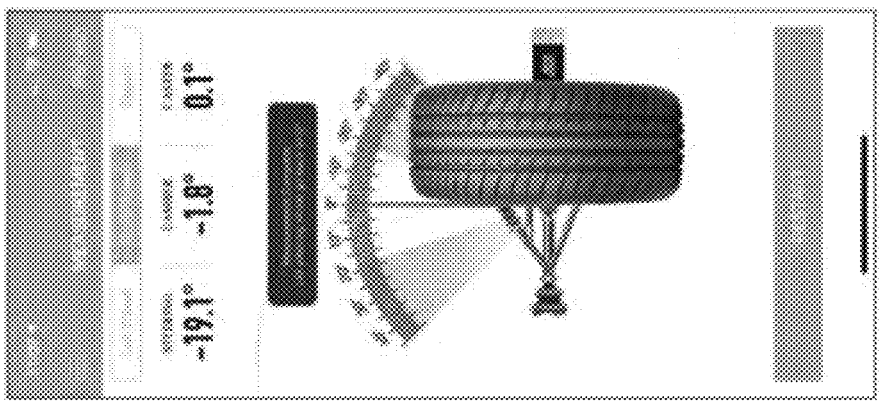

The icon 204 can be configured to control operations related to beginning a new measurement, such as illustrated by FIG. 4B. For example, selecting the icon 204 can cause the sensor 102 to begin a measurement process, such as including measuring a camber or a caster angle defined by the wheel 104 (FIG. 1) in real-time. The sensor 102 can collect acceleration data, such as by including an IMU, to track a geospatial position or orientation of the wheel 104, to measure or otherwise determine the camber or caster angles defined by the wheel 104. A measurement process can include operating a steering system of a vehicle, such as partially or completely through a range of motion of the steering system. Such an operation can improve the accuracy of the measurement process as, while a wheel is generally vertical when centered (e.g. zero degrees of steering angle), it can begin to lean inwardly when turned by the steering system of the vehicle the wheel is coupled to. For example, a steering wheel of the vehicle can be rotated from a center orientation (e.g. zero degrees) to a maximum left or right steering lock position, and such an operation can be prompted or made in response to a visual or auditory alert instructing a user to perform various aspects or steps of the measurement process.

Figure 4C:
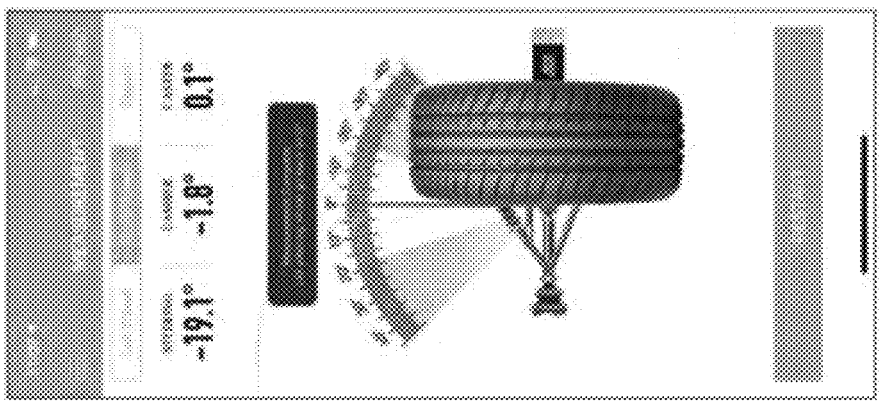
Figure 4D:
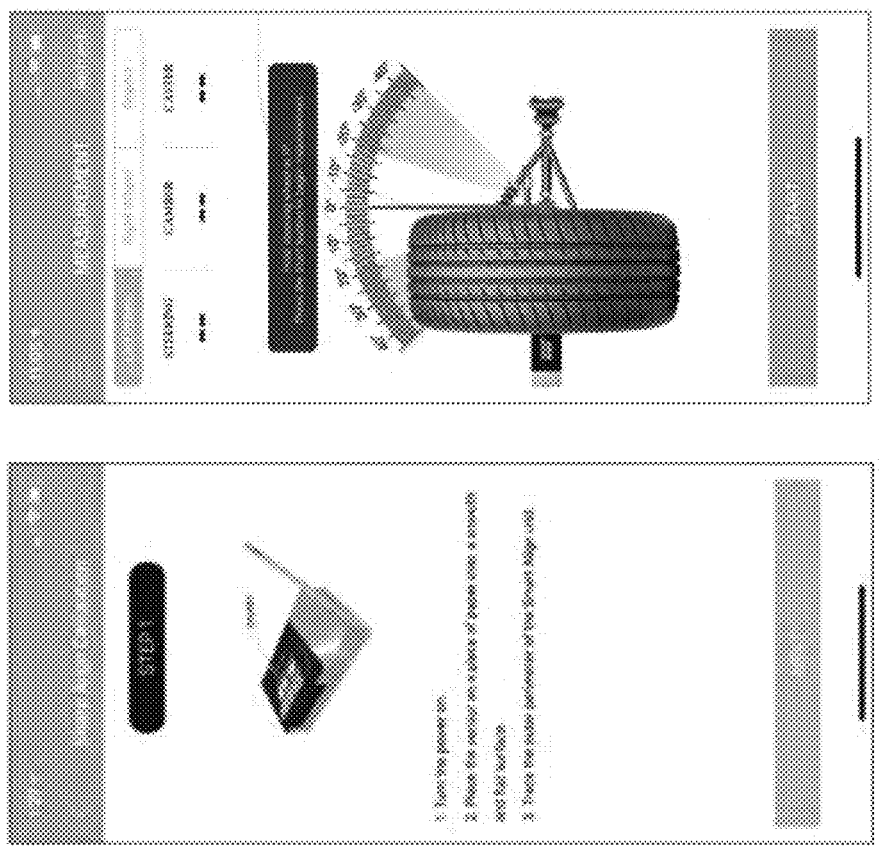

In various embodiments, the application can be configured to allow a user to select, for example, whether to begin measurement of a right or a left wheel front wheel, or to subsequently switch between the two, such as to measure a camber and a caster angle of both the right and the left front wheels of a vehicle. In such an example, the sensor 102 can be located on only one of the right front wheel or the left front wheel, such as illustrated in FIG. 4B. The measurement process can end with the computer system 120 generating a report, such as to allow a user to view and save any measured alignment angles, such as illustrated by FIG. 4C. The icon 206 can be configured to control other related operations of any of the sensor 102 or the computer system 120, such as initiating a live display of one or more alignment angles, such as including real-time display of camber and caster angles of the wheel 104.

The icon 208 can be configured to control operations including generating a report or a list of previously saved reports. The report can include information such as a previously measured camber or caster angle, the date and time such measurements were taken, the measurement location on a map, the prevailing weather conditions at the time such measurements were taken, such as temperature, any user input notes, a photo(s) of the vehicle or the wheel 104. In various embodiments, any such information can be displayed in the form of detailed list, such as illustrated by FIG. 4D.

The sensor 102 can generally be an inertial sensor, such as to collect accelerometer data via an inertial measurement unit ("IMU"). The computer system 120 can receive the data, such as to continuously measure or otherwise determine one or more alignment angles defined by the geospatial position of the wheel 104. In the field of inertial tracking a number of methods are known and used to determine a position of a movable object affixed to an IMU. Accordingly, the computer system 120, such by running or otherwise utilizing the application, can implement any of a variety of different methods such as including algorithms or functions configured to track three-dimensional motion of the sensor 102 with an IMU.

For example, any number of data points (e.g., location coordinates) can be calculated from acceleration data (e.g., translation relative to a geospatial location) by the computer system 120, such as to help interpret movement of the wheel 104. The geospatial location can be a fixed location point recorded by the sensor 102 at a specific position of the wheel, such as defined or otherwise realized by a steering wheel of a vehicle positioned at central or a neutral orientation (e.g., zero degrees of steering angle). As such, the geospatial location, together with relating the vertical and horizontal axes (e.g., the third axis A3 and the fourth axis A4) of the alignment frame 100 (FIGS. 1-2) parallel to vertical and horizontal axes of the wheel 104 (e.g., the first axis A1 and the second axis A2 (FIG. 1), can be used to help calibrate the sensor 102.

In various embodiments, the sensor 102 can also include a gyroscope. In such an example, the computer system 120 can implement integration of the rate of rotation data (e.g., angular velocity), such as generated by the gyroscope, to provide an orientation estimate for the sensor 102 at a given point in time. Once the orientation of the sensor 102 is known, the acceleration data collected by the sensor 102 can be transformed to relate the orientation of the sensor 102 relative to a geospatial location. Such embodiments can help to reduce or eliminate the need to fixedly position the sensor 102 parallel to vertical and horizontal axes of the wheel 104, which may reduce an amount of time a user may spend to configure or otherwise adjust various features of the alignment frame 100, or reduce measurement errors due to inadvertent movement of the sensor 102 relative to the alignment frame 100, or to the wheel 104, during a measurement process.

Figure 5:
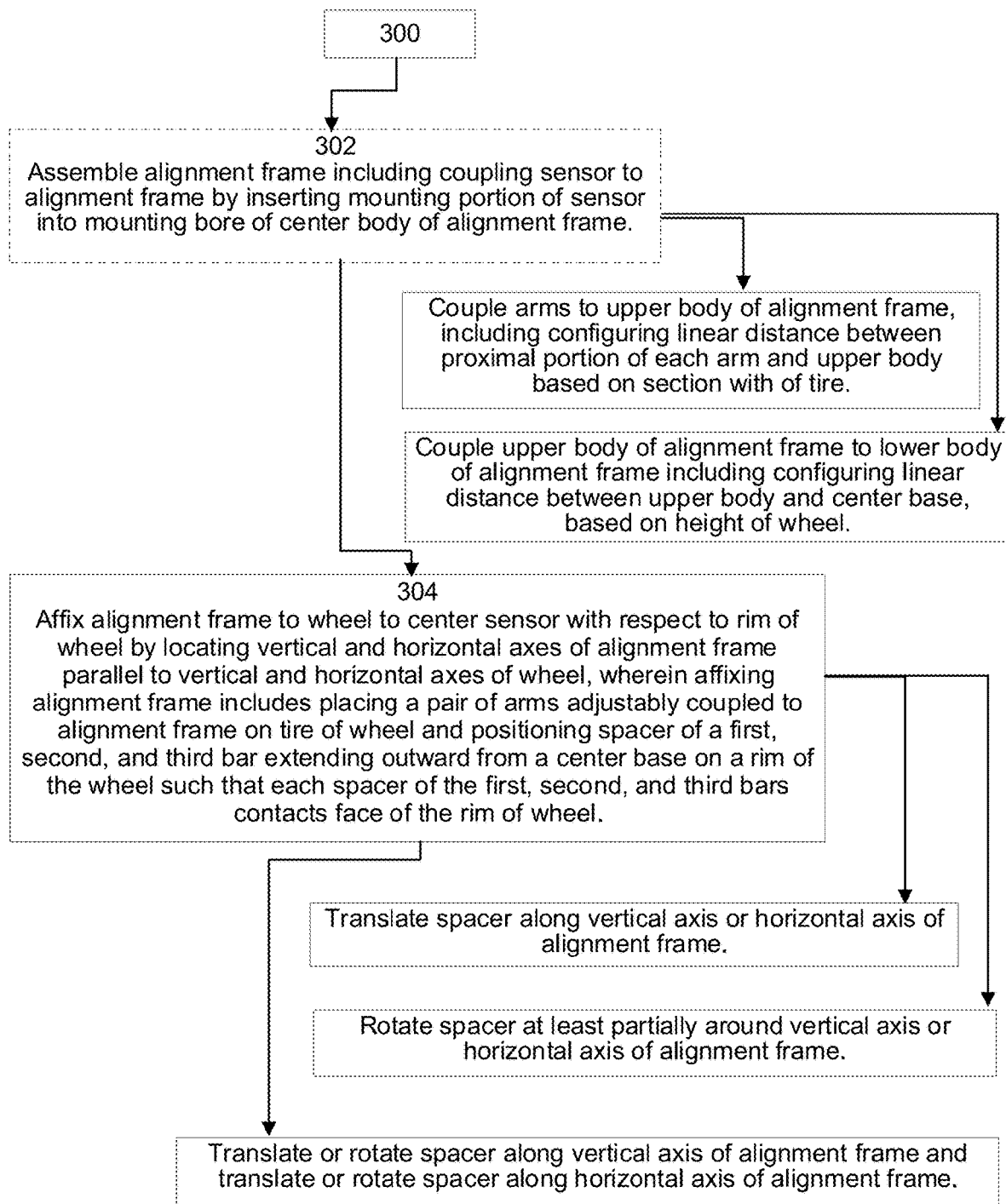
FIG. 5 illustrates a flowchart showing a method of affixing a sensor configured to measure one or more alignment angles, to a wheel of a vehicle, in accordance with at least one embodiment of the present application.

The approaches discussed above are simply several of many potential mechanisms for implementing inertial tracking based on data generated by three-axis, six, or nine-axis IMUs, in accordance with this disclosure. As previously stated above, the sensor 102 can be the SA-1000 Solo Align Caster Camber Angle Sensor by Jackco® Transnational Inc. of Azusa, CA. More information relating the operation and functionality of the sensor 102 and any corresponding software (e.g., the application) can be found in the Jackco® Solo Align® SA-1000 User's Manual, which is herein incorporated by reference in its entirety, and can be found at http://jackco.com/manuals/SA-1000-manual.pdf FIG. 5 illustrates a flowchart showing a method 300 of affixing a sensor configured to measure one or more alignment angles, to a wheel of a vehicle, in accordance with at least one embodiment of the present application. The discussed operations can be performed in parallel or in a different sequence without materially impacting other operations. The method 300 as discussed includes operations that can be performed by multiple different actors, devices, and/or systems. It is understood that subsets of the operations discussed in the method 300 can be attributable to a single actor device, or system, and could be considered a separate standalone process or method.

The method 300 can optionally begin with operation 302. In various embodiments, the operation 302 can include coupling the sensor to the alignment frame by inserting a mounting portion of the sensor into a mounting bore of a center body of the alignment frame. For example, the mounting bore can be configured to receive, contact, or otherwise engage the mounting portion of the sensor to allow the sensor 102 to rotate or otherwise move under gravity to align a surface of sensor 102 with the vertical axis of the frame, and another surface of the sensor 102 with the horizontal axis of the frame.

In various embodiments, the operation 302 can include coupling the pair of arms to an upper body of the alignment frame, and wherein coupling the pair of arms to the upper body includes configuring a linear distance between a proximal portion of each arm and the upper body based on the section width of the tire. For example, the upper body can receive four upper fasteners, such as arranged as two pairs of upper fasteners, each of the pairs aligned in linear arrangement along first and second ends of the upper body to allow a user couple each arm of the pair of arms to the upper body in a first linear position using a first pair of fasteners or in a section linear position using a second pair of fasteners. In such an example, the pair of arms in the first linear position can define a linear distance greater than or less than the pair of arms when in the second linear position.

In various embodiments, the operation 302 can include coupling an upper body of the alignment frame to the center body, and wherein coupling the upper body to the center body includes configuring a linear distance between the upper body and the center body based on a height of the wheel. For example, the center body can include a vertical member extending therefrom parallel to, and laterally offset from, a vertical axis of the alignment frame. In such an example, the upper body can be adjustably coupled to the vertical member to allow a user to translate the center body upward or downward to locate or axially align the center body with a center of a rim of the wheel.

The method can include operation 304. The operation 304 can include affixing an alignment frame to the wheel to center the sensor with respect to a rim of the wheel by locating vertical and horizontal axes of the alignment frame parallel to vertical and horizontal axes of the wheel, wherein affixing the frame includes placing a pair of arms adjustably coupled to the frame on a tire of the wheel such that the pair of arms contacts and extends at least partially along a section width of the tire. For example, the pair of arms can extend outward from an upper body of the frame, and a user can extend a portion or segment of the pair of arms over and onto a generally upper surface of the tire.

In various embodiments, the operation 304 can include lowering a plurality of protrusions extending from an inner surface of each arm of the pair of arms into at least one tread feature defined by the tire to inhibit distal translation of the alignment frame with respect to the wheel. For example, the protrusions can be formed on or in various locations and in a linear arrangement along a longitudinal length of each arm of the pair of arms, such as to help a user to adjustably locate and secure the frame on or along a tire of the wheel, by inhibiting or otherwise preventing translation of the pair of arms and thereby the alignment frame with respect to the tire of the wheel.

In various embodiments, the operation 304 can include positioning a spacer of a first, second, and third bar extending outward from a center base on a rim of the wheel such that each spacer of the first, second, and third bars contacts a face of the rim of the wheel, the first bar defining a vertical axis of the alignment frame and the second and third bars defining a horizontal axis of the alignment frame, wherein the vertical axis of the frame defined by the first bar extends at ninety degrees from the horizontal axis of the alignment frame defined by the second and third bar.

In various embodiments, the operation 304 can include translating at least one spacer along the vertical axis or the horizontal axis of the alignment frame. For example, each spacer can include a spacer bore configured to receive, contact, or otherwise engage one of the first bar, second bar, or third bar such that a user can apply a force to each spacer to translate the spacer along a longitudinal length of one of the first bar, second bar, or third bar. A user can translate each spacer to bring each spacer into concurrent contact with a face or distal surface of the rim of the wheel, such as based on a diameter of the rim.

In various embodiments, the operation 304 can include rotating at least one spacer at least partially around the vertical axis or the horizontal axis of the alignment frame. For example, each spacer can include a spacer bore configured to receive, contact, or otherwise engage one of the first bar, second bar, or third bar such that a user can apply a force to each spacer to rotate the spacer around an axis defined by one of the first bar, second bar, or third bar. A user can rotate each spacer to bring each spacer into concurrent contact with a face or distal surface of the rim of the wheel, such as based on a diameter of the rim or a section width of a tire of the wheel.

FIG. 6 illustrates a flowchart showing a method 400 of measuring a camber or a caster angle defined by a wheel of a vehicle, in accordance with at least one embodiment of the present application. The steps or operations of the method 400 are illustrated in a particular order for convenience and clarity. The discussed operations can be performed in parallel or in a different sequence without materially impacting other operations. The method 400 as discussed includes operations that can be performed by multiple different actors, devices, and/or systems. It is understood that subsets of the operations discussed in the method 400 can be attributable to a single actor device, or system, and could be considered a separate standalone process or method.

The method 400 can include operation 402. The operation 402 can affixing an alignment frame including a sensor to the wheel to locate vertical and horizontal axes of the alignment frame parallel to vertical and horizontal axes of the wheel, wherein affixing the alignment frame includes positioning a pair of arms adjustably coupled to the alignment frame on a tire of the wheel such that the pair of arms contacts and extends substantially along a section width of the tire and positioning a spacer of a first, second, and a third bar of the alignment frame on a rim of the wheel. Operation 402 can include any of the operations 302-306 of the method 300 discussed above with regard to FIG. 5.

The method 400 can include operation 404. The operation 404 can include activating circuitry of a computer system operably coupled to the sensor to cause the sensor to generate data associated with a geospatial position of the wheel. For example, a user can cause processing circuitry of a computer system, such as via one or more user inputs to an input or an input output device of the computer system, to implement operations of the sensor, such as by activating and controlling an IMU of the sensor device to collect acceleration data. The computer system can be configured to receive the acceleration data, such as to determine one or more alignment angles by utilizing software running on processing circuitry of the computer system to implement any of a variety of different algorithms configured to help track motion of the sensor.

In various embodiments, the computer system can be a mobile device, and activating circuitry of the computer system can include one or more user inputs to a graphical user interface displayed on the display screen of the computer system. For example, the graphical user interface can be a home screen of a custom or otherwise proprietary mobile software application, such as designed to control communication between, and control various functions of, the sensor and the computer system. In various embodiments, the computer system can also be configured to generate visual or auditory instructions to assist a user in one or more aspects of activating circuitry of the computer system or otherwise in measuring the camber or the caster angle.

For example, processing circuitry of the computer system can be configured to cause the computer system to display one or more instructions or generate an audible alert, such as to cause a user to rotate or translate the sensor 102, or otherwise position or adjust the alignment frame 100, to align the sensor 102 with vertical and horizontal axes of a wheel to help calibrate the sensor 102. In some examples, such processing circuitry can be configured to cause the computer system to display one or more user instructions or generate and audible alert to cause the user to select measurement of a right or a left wheel front wheel of the vehicle, or to switch between measurement of the two, such as to help perform alignment of both the left and the right front wheels of a vehicle without decoupling the alignment frame or the sensor from the wheel.

The method 400 can include operation 406. The operation 406 can include operating a steering system of the vehicle to cause the wheel to move throughout a range of motion defined by the steering system; wherein the computer system is configured to analyze the data generated by the sensor to determine and display the camber or the caster angle to a user on a display screen of the computer system. In various embodiments, operating the steering system of the vehicle can be performed in response to one or more visual or auditory alerts generated by the computer system. For example, processing circuitry of the computer system can be configured to cause the computer system to display an instruction or output an audible alert, such as to cause a user to begin, continue, or end operation of the steering system.

The above detailed description includes references to the accompanying drawings, which form a part of the detailed description. The drawings show, by way of illustration, specific embodiments in which the invention can be practiced. These embodiments are also referred to herein as "examples." In this document, the terms "a" or "an" are used, as is common in patent documents, to include one or more than one, independent of any other instances or usages of "at least one" or "one or more." The scope of the invention should be determined with reference to the appended claims, along with the full scope of equivalents to which such claims are entitled.

Notes and Examples

The following, non-limiting examples, detail certain aspects of the present subject matter to solve the challenges and provide the benefits discussed herein, among others.

Example 1 is an alignment frame for affixing a sensor configured to measure one or more alignment angles of a vehicle to a wheel of the vehicle, the wheel having a tire on a rim, the frame comprising: an upper body coupled to a pair of arms, the arms configured to contact the tire mounted on the wheel to support the alignment frame, wherein the arms are configured to extend at least partially along a section width of the tire when mounted on the tire; a center base configured to receive a first bar, a second bar and third bar orthogonally aligned such that the second and third bars are in a linear alignment to define a horizontal axis of the alignment frame and such that the first bar is at ninety degrees from the horizontal axis defined by the second and third bar, the first bar thereby defining a vertical axis of the alignment frame; a spacer positioned on each of the first, second, and third bars, each spacer configured to align the first, second, and third bars with a face of the rim so as to center the center base with respect to the rim of the wheel; and wherein the center base defines a mounting bore configured to receive a mounting portion of the sensor to center the sensor with the respect to the rim of the wheel, thereby providing a reference for using the sensor to align a camber and caster angle of the wheel.

In Example 2, the subject matter of Example 1 includes, wherein each arm of the pair of arms is adjustably coupled to the upper body to enable the alignment frame to be configurable based on the section width of the tire.

In Example 3, the subject matter of Example 2 includes, wherein each arm of the pair of arms is detachably coupled to the upper body with a threaded fastener.

In Example 4, the subject matter of Examples 1-3 includes, wherein the upper body is slidably and rotatably connected to the center base to enable the alignment frame to be configurable based on a height of the wheel.

In Example 5, the subject matter of Examples 1-4 includes, wherein each arm of the pair of arms includes a plurality of protrusions extending from an inner surface thereof, the protrusions configured to engage the tire to inhibit distal translation of the frame with respect to the wheel.

In Example 6, the subject matter of Examples 1-5 includes, wherein the spacer positioned on each of the first, second, and third bars is translatable along each of the first, second, and third bars, respectively to enable the alignment frame be configurable based on a diameter of the wheel.

In Example 7, the subject matter of Example 6 includes, wherein the spacer positioned on each of the first, second, and third bars is rotatable around each of the first, second, and third arms, respectively.

In Example 8, the subject matter of Examples 1-7 includes, wherein the mounting portion of the sensor is configured to rotate within the mounting bore of the center base under gravity to align the sensor with the vertical axis and the horizontal axis of the alignment frame.

In Example 9, the subject matter of Examples 1-8 includes, wherein the mounting portion of the sensor is detachably coupled to the center base with a threaded fastener extending into the mounting bore of the center base to engage the mounting portion of the sensor positioned therein.

Example 10 is a method of affixing a sensor configured to measure a camber or caster angle of a wheel of a vehicle to the wheel of the vehicle, the method comprising: affixing an alignment frame to the wheel to center the sensor with respect to a rim of the wheel by locating vertical and horizontal axes of the alignment frame parallel to vertical and horizontal axes of the wheel, wherein affixing the frame includes: placing a pair of arms adjustably coupled to the frame on a tire of the wheel such that the pair of arms contacts and extends at least partially along a section width of the tire; and positioning a spacer of a first, second, and third bar extending outward from a center base on a rim of the wheel such that each spacer of the first, second, and third bars contacts a face of the rim of the wheel, the first bar defining a vertical axis of the alignment frame and the second and third bars defining a horizontal axis of the alignment frame, wherein the vertical axis of the frame defined by the first bar extends at ninety degrees from the horizontal axis of the alignment frame defined by the second and third bar.

In Example 11, the subject matter of Example 10 includes, wherein the method first comprises assembling the alignment frame, wherein assembling the alignment frame includes coupling the sensor to the alignment frame by inserting a mounting portion of the sensor into a mounting bore of the center body.

In Example 12, the subject matter of Example 11 includes, wherein assembling the alignment frame includes coupling the pair of arms to an upper body of the alignment frame, and wherein coupling the pair of arms to the upper body includes configuring a linear distance between a proximal portion of each arm and the upper body based on the section width of the tire.

In Example 13, the subject matter of Examples 11-12 includes, wherein assembling the frame includes coupling an upper body of the alignment frame to the center body, and wherein coupling the upper body to the center body includes configuring a linear distance between the upper body and the center body based on a height of the wheel.

In Example 14, the subject matter of Examples 10-13 includes, wherein placing the pair of arms includes lowering a plurality of protrusions extending from an inner surface of each arm of the pair of arms into at least one tread feature defined by the tire to inhibit distal translation of the alignment frame with respect to the wheel.

In Example 15, the subject matter of Examples 10-14 includes, wherein positioning the spacer of the first, second, and third bars includes translating at least one spacer along the vertical axis or the horizontal axis of the alignment frame.

In Example 16, the subject matter of Examples 10-15 includes, wherein positioning the spacer of each of the first, second, and third bars includes rotating at least one spacer at least partially around the vertical axis or the horizontal axis of the alignment frame.

In Example 17, the subject matter of Examples 10-16 includes, wherein positioning the spacer of the first, second, and third bars includes at least one spacer along the vertical axis or the horizontal axis of the alignment frame and rotating at least one spacer at least partially around the vertical axis or the horizontal axis of the alignment frame.

Example 18 is a method of measuring a camber or a caster angle defined by a wheel of a vehicle, wherein measuring the camber or the caster angle includes: affixing an alignment frame including a sensor to the wheel to locate vertical and horizontal axes of the alignment frame parallel to vertical and horizontal axes of the wheel, wherein affixing the alignment frame includes, positioning a pair of arms adjustably coupled to the alignment frame on a tire of the wheel such that the pair of arms contacts and extends substantially along a section width of the tire and positioning a spacer of a first, second, and a third bar of the alignment frame on a rim of the wheel; activating circuitry of a computer system operably coupled to the sensor to cause the sensor to generate data associated with a geospatial position of the wheel; and operating a steering system of the vehicle to cause the wheel to move throughout a range of motion defined by the steering system; wherein the computer system is configured to analyze the data generated by the sensor to determine and display the camber or the caster angle to a user on a display screen of the computer system.

In Example 19, the subject matter of Example 18 includes, wherein the computer system is a mobile device, and wherein activating circuitry of the computer system includes one or more user inputs to a graphical user interface displayed on the display screen of the computer system.

In Example 20, the subject matter of Examples 18-19 includes, wherein operating the steering system of the vehicle is performed in response to one or more visual or auditory alerts generated by the computer system.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A method of measuring a camber or a caster angle defined by a wheel of a vehicle, wherein measuring the camber or the caster angle includes:
    affixing an alignment frame including a sensor to the wheel to locate vertical and horizontal axes of the alignment frame parallel to vertical and horizontal axes of the wheel, wherein affixing the alignment frame includes positioning a pair of arms adjustably coupled to the alignment frame on a tire of the wheel such that the pair of arms contacts and extends substantially along a section width of the tire and positioning a spacer of a first, second, and a third bar of the alignment frame on a rim of the wheel;
    activating circuitry of a computer system operably coupled to the sensor to cause the sensor to generate data associated with a geospatial position of the wheel; and
    operating a steering system of the vehicle to cause the wheel to move throughout a range of motion defined by the steering system;
wherein the computer system is configured to analyze the data generated by the sensor to determine and display the camber or the caster angle to a user on a display screen of the computer system.

2. The method of claim 1, wherein the computer system is a mobile device, and wherein activating circuitry of the computer system includes one or more user inputs to a graphical user interface displayed on the display screen of the computer system.

3. The method of claim 2, wherein the graphical user interface includes selectable icons for controlling sensor calibration, measurement initiation, and measurement report generation.

4. The method of claim 2, wherein the graphical user interface is configured to display real-time camber and caster angle measurements.

5. The method of claim 2, wherein the computer system is configured to store measurement reports including date, time, location, and environmental conditions.

6. The method of claim 1, wherein operating the steering system of the vehicle is performed in response to one or more visual or auditory alerts generated by the computer system.

7. The method of claim 1, wherein the sensor includes an inertial measurement unit configured to collect acceleration data to track the geospatial position of the wheel.

8. The method of claim 1, wherein the sensor includes a gyroscope configured to generate rate of rotation data to provide orientation estimates.

9. The method of claim 1, wherein the computer system is configured to store and display previously measured alignment angles for future reference.

10. The method of claim 1, wherein the computer system is configured to generate visual or auditory alerts to guide a user through the measurement process.

11. The method of claim 1, wherein affixing the alignment frame includes configuring a linear distance between a proximal portion of each arm and an upper body based on the section width of the tire.

12. The method of claim 1, wherein affixing the alignment frame includes configuring a linear distance between an upper body and a center body based on a height of the wheel.

13. The method of claim 1, wherein the pair of arms includes a plurality of protrusions extending from an inner surface configured to engage the tire to inhibit distal translation.

14. The method of claim 1, wherein positioning the spacer includes translating at least one spacer along the vertical axis or horizontal axis of the alignment frame.

15. The method of claim 1, wherein positioning the spacer includes rotating at least one spacer at least partially around the vertical axis or horizontal axis of the alignment frame.

16. The method of claim 1, wherein the sensor is detachably coupled to a center base of the alignment frame with a threaded fastener.

17. The method of claim 1, wherein the sensor includes a mounting portion configured to rotate within a mounting bore under gravity to align with vertical and horizontal axes.

18. The method of claim 1, wherein the computer system is configured to allow measurement of both right and left wheels without decoupling the alignment frame.

19. The method of claim 1, wherein the computer system implements algorithms configured to track three-dimensional motion of the sensor.

20. The method of claim 1, wherein the computer system is configured to calibrate the sensor by recording a fixed location point when a steering wheel is at a neutral orientation.

* * * * *